Oct. 31, 1972

J. A. HAINES 3,701,589

VARIABLE WIDTH SLIT MECHANISM FOR USE
IN A SCANNING MONOCHROMATOR

Filed Nov. 8, 1968

INVENTOR
JACK A. HAINES

BY Arnold, Roylance, Kruger & Durkee

ATTORNEYS.

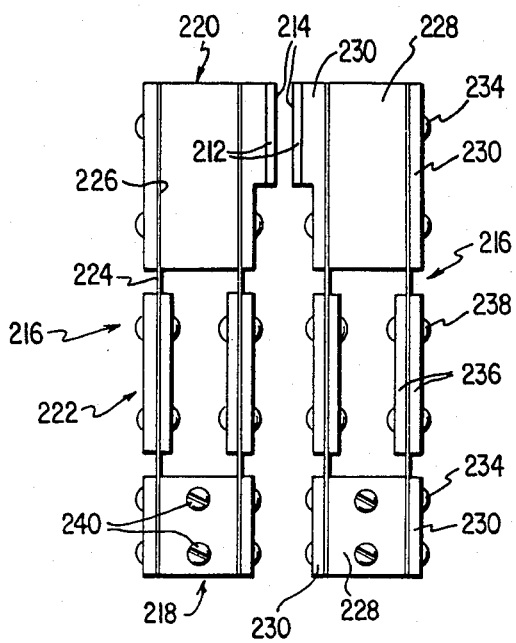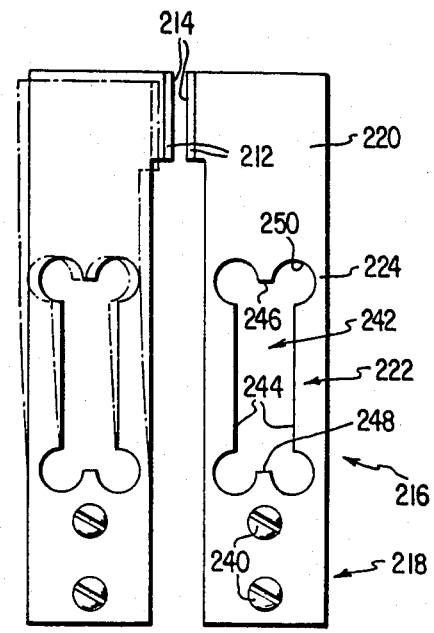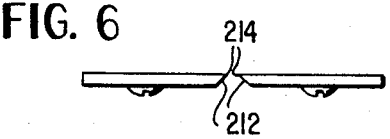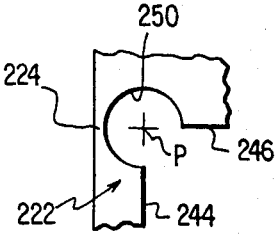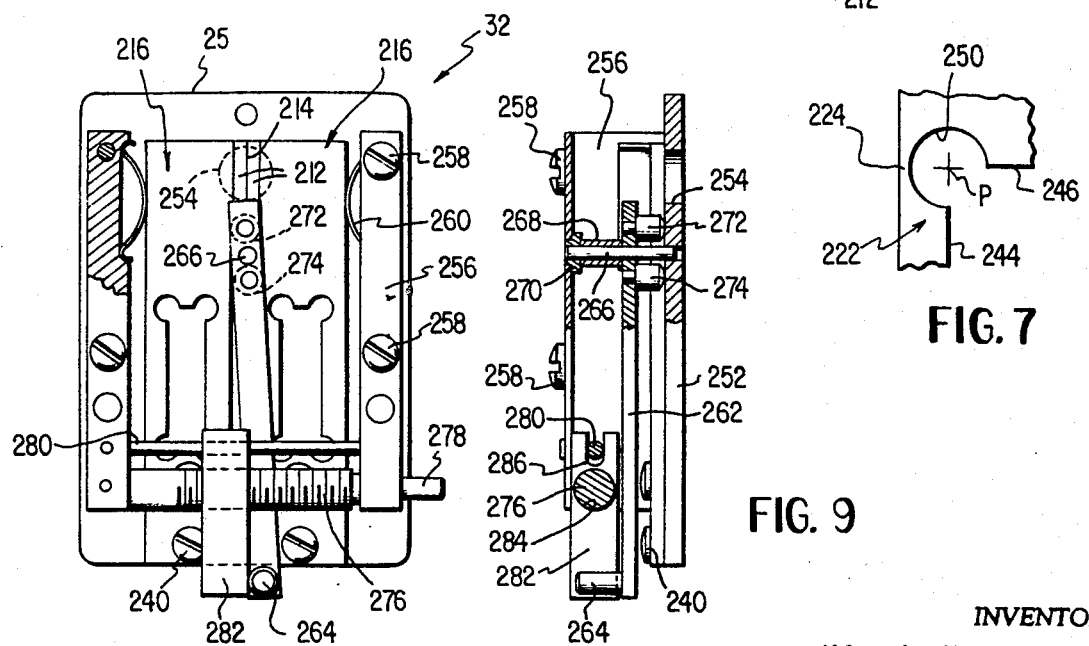

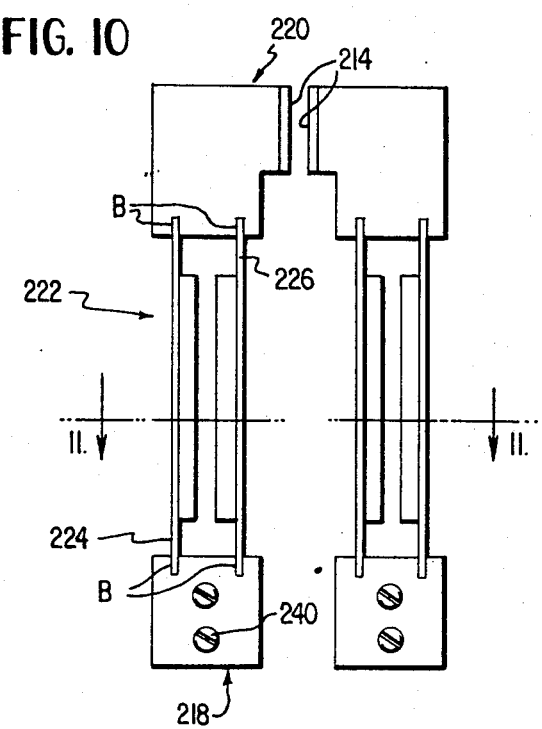
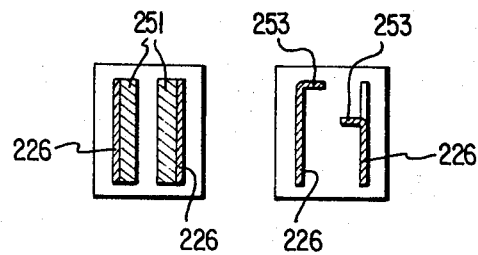
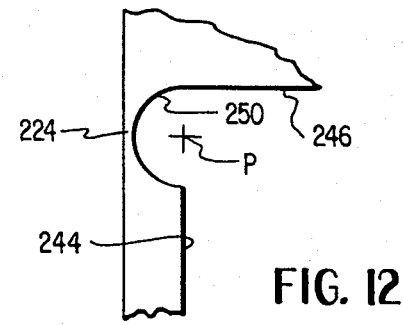
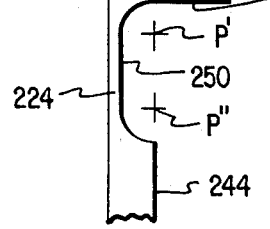
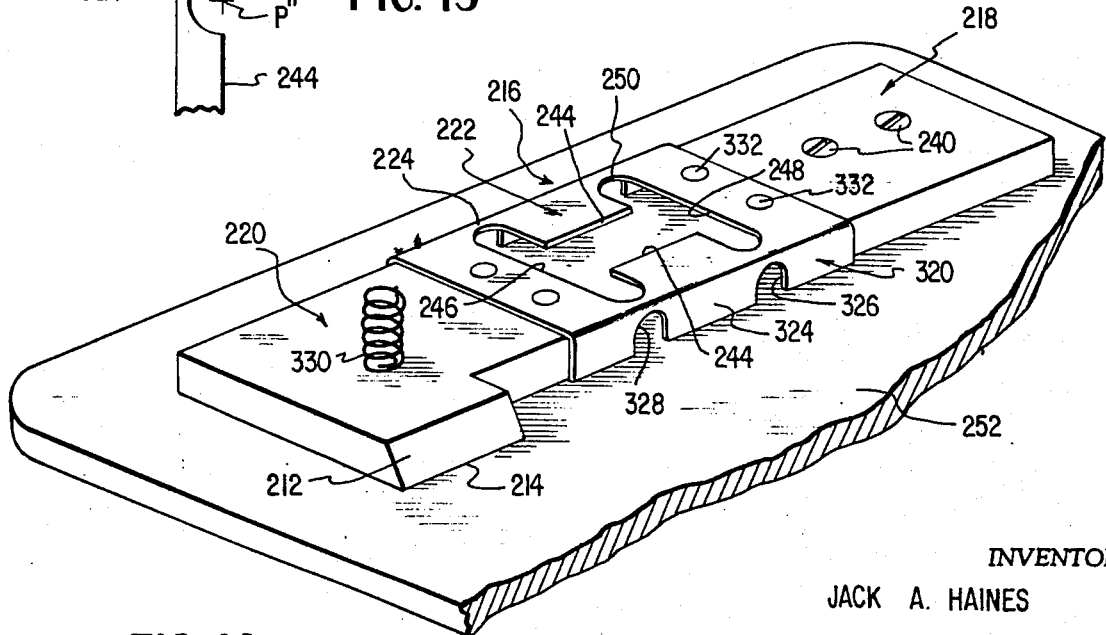

United States Patent Office 3,701,589
Patented Oct. 31, 1972

3,701,589
VARIABLE WIDTH SLIT MECHANISM FOR USE IN A SCANNING MONOCHROMATOR
Jack A. Haines, Champaign, Ill., assignor to Heath Company, St. Joseph, Mich.
Filed Nov. 8, 1968, Ser. No. 774,301
Int. Cl. G02f 1/30; G01j 3/12
U.S. Cl. 350—271                     3 Claims

ABSTRACT OF THE DISCLOSURE

In a scanning monochromator of the diffraction grating type, an improved slit mechanism is provided adjacent the monochromator entrance and exit ports. Each slit mechanism includes a pair of closely spaced parallel slit edges and, additionally, incorporates a parallelogram arrangement. The parallelogram arrangement permits the slit edges forming a slit to be moved relatively toward and away from one another to vary the slit width, but the edges are always maintained in very accurate parallelism. A unique drive arrangement connects the inlet port slit mechanism and the outlet port slit mechanism so that an increase or decrease in the slit width of one causes a corresponding increase or decrease in the slit width of the other. A further unique drive arrangement permits the diffraction grating to be adjusted at either normal scanning speed or at rapid speed.

---

This invention relates to optical instruments and more particularly it relates to a scanning monochromator having a very accurately variable slit mechanism therein.

In the conventional monochromator, a multi-wavelength beam of light in introduced through an entrance port into the interior of the instrument. Through prismatic means or through use of a diffraction grating, this multi-wavelength light beam is split or dispersed into a spread series of wavelengths, and thereafter, a selected narrow band or range or wavelengths is transmitted out of the instrument through the exit port. In an instrument of this type, slit mechanism means is customarily provided, each such slit mechanism including a pair of closely spaced parallel edges which define therebetween a very narrow passage or slit through which the light beam can traverse.

It has been found that by varying the width of this slit in a controlled manner, the output characteristics of the monochromator can be selectively adjusted. The adjustment of the slit mechanism associated with the exit port determines the width of the wavelength band or range emitting from the monochromator and hence serves as a control for the resolving power of the instrument. On the other hand, it is also considered desirable to vary the width of the slit mechanism associated with the entrance port to control the range of light which reaches the diffraction grating. This control of the width of the entrance slit reduces the scattering of the light and prevents the same from reflecting from the diffraction grating at undesired stray angles. This stray scattering, which is of a secondary nature, tends to cause blurring of the image produced at the exit slit. As a result, it is both desirable and beneficial to provide a monochromator where both the entrance and exit slits can be very accurately varied.

There have, in the past, been many proposals and suggestions for varying the slit mechanisms in optical devices such as monochromators, but none of these prior art proposals have proved to be entirely satisfactory. It must be remembered that the requirements in any slit mechanism adjustment are, first, that the spaced edges forming the slit will always be maintained in absolute parallelism, and second, that the varying or adjusting control be very fine and accurate so that the distance between the slit edges be maintained to very precise tolerances. Some known prior art arrangements utilize leaf springs which support the movable members carrying the slit edges, and bias the edges to a particular position. However, in such an arrangement, the slightest variation in the spring force constant, because of variations in size or material, or because of internal stresses, could throw off the parallelism of the slit edges. Other forms of prior art arrangements apply mechanical or fluid power to create an elastic deformation in the members upon which the slit edges are mounted as a means for varying the width between the slit edges, but once again, any variation due to the material forming the members or the construction thereof would create an unbalance which would destroy the parallelism between the slit edges.

In short, none of the known prior art arrangements provide an entirely satisfactory technique for accurately controlling and varying the slit width in a monochromator mechanism, and, accordingly, it is an object of the present invention to overcome the difficulties and deficiencies associated with the prior art and to provide, instead, a new and improved variable slit mechanism which can advantageously be used in monochromators and other similar types of optical devices.

Another object of the present invention is to provide a novel actuating means which moves the members carrying the slit edges to adjust the width of the slit in a slit mechanism.

Another object of the present invention is to provide a new and improved scanning monochromator which is capable of providing extremely accurate and high resolution.

Another object of the present invention is to provide a scanning monochromator having a controlled slit width mechanism associated with both the exit port and the entrance port, the former providing a controllable means for increasing the resolution of the monochromator and the latter providing a controllable means for reducing secondary blurring and scattering.

Another object of the present invention is to provide an improved drive means for a monochromator diffraction grating to enable normal sequential grating adjustment or rapid continuous grating adjustment.

Further objects of the present invention include the provision of a scanning monochromator which (a) includes a unique and rapidly controlled scanning mechanism, (b) provides a simplified form of visual information readout, (c) is rigid, durable and mechanically stable, (d) can be readily used in conjunction with other laboratory instruments, such as spectrophotometers, and (e) has a simple digitally controlled slit width adjustment mechanism.

Other objects, advantages, and salient features of the present invention will become apparent from the following detailed description which, taken in conjunction with the annexed drawings, discloses various embodiments thereof.

The foregoing objects are attained generally by the provision of a scanning monochromator wherein the entrance port is aligned with the exit port along an optical axis so that the wavelength band emitting from the instrument is aligned along the same optical axis as the light beam entering the axis. As the light beam enters the monochromator through the entrance port, it passes through the entrance slit mechanism and is reflected from a flat mirror to a parabolic collimating mirror. From this parabolic mirror, the light beam is focused upon a diffraction grating controlled by a lead screw and sine bar mechanical system which move the diffraction grating so that it will transmit a selected range of light wavelengths onto a further parabolic mirror which acts as a focusing mirror. This further parabolic mirror then transmits the range of wavelength information to a further flat mirror which reflects the same through the exit slit mechanism and through the exit port.

Each slit mechanism includes a pair of slit edge units which include a parallelogram arrangement. Each slit edge unit includes a fixed member, a parallel movable member carrying the slit edge, and a pair of spaced parallel rigid links interconnecting the fixed and movable members. At the opposite ends of each of the links, where the same join with the members, a flexural or hinge joint is provided to serve substantially the same function as a true pivot point would serve in a true parallelogram linkage. As a result, when the movable members carrying the slit edge is moved, both links connected thereto are both pivoted or turned, while maintaining their parallelism, thereby reducing the perpendicular distance between the fixed member and the movable member, but nevertheless maintaining these members in parallelism. As a result of this parallelogram type of connection in each slit edge unit, the two slit edges which form either the entrance or exit slit can be moved relatively toward or away from one another, thus causing the slit edge carrying movable members to be moved somewhat, but the slit edges will nevertheless be maintained in parallelism at all times.

The entrance slit mechanism and the exit slit mechanism of the present invention are connected together or ganged in such a manner that adjustment of one slit width will cause a corresponding adjustment of the other slit width. In ths manner, a precise single adjustment will cause a particular increase or decrease in both the entrance slit mechanism and the exit slit mechanism. This ganged adjustment is advantageously accomplished by providing in each slit mechanism, a pivotal bar having a pivot point aligned along the central axis of the slit and a pair of projecting pins carried by the bar and engageable with the members carrying the slit edges. As the bar is pivoted, one pin will contact one slit edge member and the other pin will contact the other slit edge members so that both members and their edges are moved simultaneously and oppositely, thereby changing the width of the slit. To accomplish pivoting of the bar, a projection adjacent one end of the bar moves with a traveling block which is mounted upon a lead screw. The lead screws from both the entrance and exit port mechanisms are interconnected, as by a chain drive, so that when the chain drive is operated, both lead screws are rotated in unison to thus simultaneously adjust both slit widths.

The sine bar, lead screw mechanism for adjusting the position of the diffraction grating includes a slidable shaft carrying a gear which drives the lead screw. When the shaft is slid in one direction, it engages a clutch mechanism to permit a stepping motor to sequentially drive the lead screw and thereby adjust the grating. When the shaft is slid in the opposite direction, it engages a different clutch mechanism to permit slewing motor to continuously and rapidly drive the lead screw and thereby adjust the grating.

The invention will be better understood by reference to the accompanying drawings, forming a part of the specification herein, where:

FIGS. 4 and 5 are side elevations of two different forms of slit edge units in accordance with the present invention;

FIG. 6 is a plan view of the FIG. 5 slit edge unit;

FIG. 7 is an enlarged fragmentary elevation of the corner of the cut-out, in the FIG. 5 slit edge unit;

FIG. 8 is a front elevation of a slit mechanism in accordance with the present invention;

FIG. 9 is a side elevation of the slit mechanism of FIG. 8;

FIG. 10 is a side elevation of another form of slit edge unit in accordance with the invention;

FIG. 11 is a sectional view taken along the line 11—11 of FIG. 10;

FIGS. 12 and 13 are enlarged fragmentary elevations of modified cut-out corners for the FIG. 5 slit edge unit; and FIG. 14 is a fragmentary perspective view of a modified form of slit edge unit.

Figure 1:
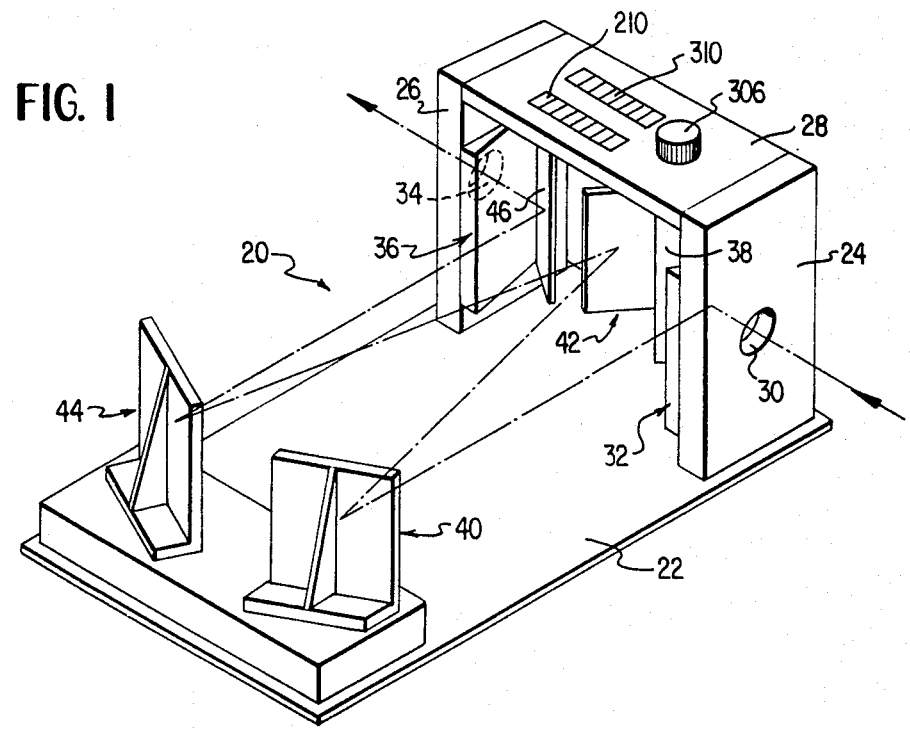
FIG. 1 is a perspective view of the monochromator of the present invention showing an illustrative light path.

Referring now to FIG. 1, there is shown, in simplified and diagrammatic form, a scanning monochromator generally designated 20 which incorporates the principles of the present invention, the monochromator having the light-tight cover removed therefrom. Broadly speaking, the monochromator which is generally designated 20 includes a flat base member 22 having a pair of spaced parallel upstanding side members 24 and 26 positioned at one end thereof. The side members are joined together at their upper ends by a cross plate 28 forming a face plate portion of the monochromator 20. An entrance port 30 is provided in the side member 24 and interiorly of the side member, adjacent the port, an entrance slit mechanism generally designated 32 is provided. In a similar manner, the side member 26 is provided with an exit port 34 and interiorly thereof adjacent the port, an exit slit mechanism generally designated 36 is provided. It is important to note that the entrance and exit ports 30 and 34 are aligned with one another along an optical axis so that the wavelength band leaving the monochromator is directed along the same axis as the light beam which enters the instrument through the entrance port 30.

The path of a light beam through the monochromator 20 is shown in phantom lines in FIG. 1 wherein it can be seen that as the beam enters the instrument through the entrance port 30 and passes through the entrance slit mechanism 32, it is reflected from a flat mirror 38 and is directed onto a parabolic mirror assembly generally designated 40 which acts as a collimator. From there, the light beam is directed onto a diffraction grating assembly generally designated 42, then reflected back onto a further parabolic mirror assembly generally designated 44 which functions as a focusing mirror. At this point, the light beam will have been separated into a selected band or range of wavelengths and this information is reflected from the mirror 44 onto a flat mirror 46, then through an exit slit mechanism 36 and out through the exit port 34. Thus, in short, it can be seen that the light beam travels on a generally planar W-shaped path within the monochromator 20, and it will, of course, be understood that in use, a cover member, not shown, will be firmly attached onto the base 22 to prevent light from entering into the interior of the instrument from anywhere other than the entrance port 30.

Figure 2:
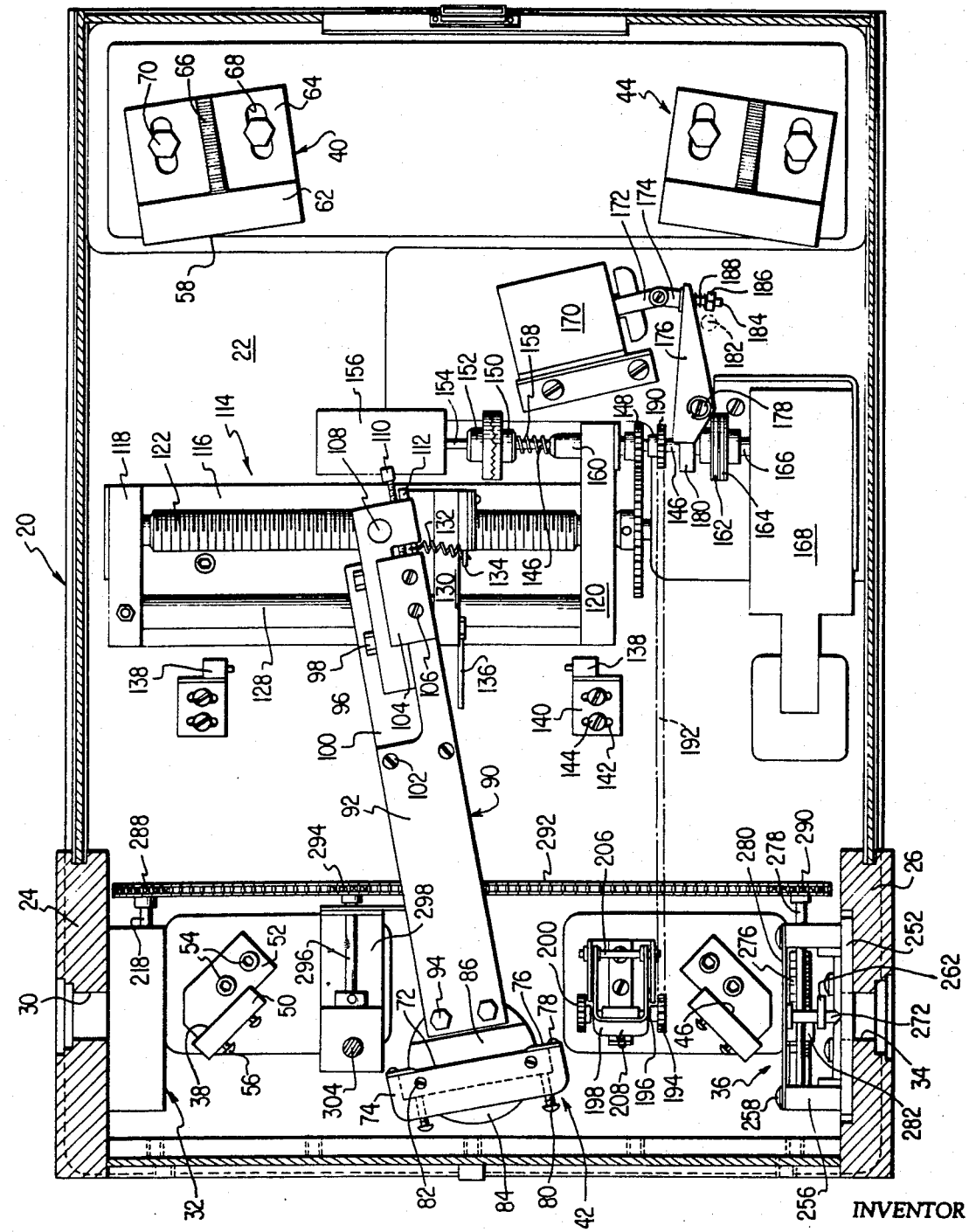
FIG. 2 is a plan view of the monochromator with the cover removed.

Referring now to FIG. 2, it will be seen that the flat or folding mirrors 38 and 46 are each disposed at an outwardly directed angle of approximately 45° with respect to the optical axis aligning the entrance and exit ports 30 and 34. Each mirror is preferably a first-surface mirror which is flat to one-quarter wavelength and which can be overcoated for durability. The mirrors themselves are mounted on upstanding plates 50 which, in turn, are supported by bottom plates 52 attached to the base 22 of the instrument by means of bolts 54. As shown in FIG. 2, and also in FIG. 3, a series of adjusting screws 56 extend through the plates 50 for the purpose of angularly adjusting the mirrors 38 and 46 as necessary. It will, therefore, be apparent that the flat or folding mirrors 38 and 46, and their assembly and mounting means, can be removed and replaced without the need for realigning the instrument itself since the particular mounting means utilized fixes the position of the mirrors in all three dimensions or along all three orthogonal axes. It will also be apparent that because of the angular disposition of the flat mirrors, the light beams reflected between these flat mirrors and their corresponding parabolic mirrors will be disposed substantially perpendicularly to the optical axis of the entrance and exit ports.

Considering the parabolic mirror assemblies 40 and 44, the former is provided with a parabolic mirrored surface 58 and the latter is provided with a parabolic mirrored surface 60. Like the flat mirrors 38 and 44, each of the parabolic mirrors 58 and 60 is a first-surface mirror, flat to within one-quarter wavelength, and the mirrors can be overcoated for durability. The mirrors themselves are mounted upon a supporting bracket assembly which includes upstanding portions 62 integrally connected with a base portion 64. A strengthening or reinforcing rib 66 extends between the back of the upstanding portion 62 and the top of the base portion 64 to facilitate handling of the assembly and to assure that the portions 62 and 64 remain disposed in a substantially perpendicular relationship. A pair of elongated slots 68 are provided in the base portion 64, one on either side of the reinforcing rib 66, and attaching bolts 70 can extend through these slots and into the base portion of the instrument for the purpose of fixedly mounting the parabolic mirrors. It will be apparent that because of the elongation of the slots 68, the angular position of the parabolic mirrors can be varied as desired merely by loosening one of the bolts 70 mounting the assembly, rotating the assembly to its new desired angular position, and then retightening the bolts 70.

Referring now to the diffraction grating assembly 42, such assembly includes a diffraction grating 72 of a high precision optical type having 30,000 lines per inch. The diffraction grating 72 is positioned on the front of an upstanding mounting block 74 and is held in position by means of four diagonally extending tabs 76 attached to the mounting block by means of screws 78. The tabs 76 extend across the four corners of the diffraction grating to hold the same in position. Four adjusting screws 80 extend through the mounting block 64 from the back thereof and contact the diffraction grating 72 at substantially the four corners thereof for adjustment purposes. Similarly, two further adjusting screws 82 extend through the top of the mounting block 74 to contact the top edge of the diffraction grating. Thus, by proper adjustment of the four screws 80 and the two screws 82, the position of the front or reflecting surface of the diffraction grating can be very accurately controlled.

The diffraction grating mounting block 74 is positioned upon a heavy rotatable cylindrical member 84 adapted to rotate about an upstanding or vertical center axis coincident with the front or reflecting surface of the diffraction grating 72. The top surface of the cylinder 84 includes a transversely extending rib 86 and the mounting block 74 attaches to the cylinder 84 by means of bolts 88 shown in FIG. 3 which extend through the bottom of the mounting block and screw into the rib 86. Thus, as the cylinder 84 rotates about its central vertical axis, the mounting block 74 and diffraction grating 72 carried thereby are likewise rotated so that the collimated light beam transmitted from the parabolic mirror 58 onto the diffraction grating will strike a particular selected portion thereof, such portion being predetermined by the position to which the diffraction grating has been rotated.

Rotation of the diffraction grating, its mounting block and mounting cylinder, is accomplished by means of an elongated sine bar assembly generally designated 90. The sine bar assembly includes a flat elongated bar 92, preferably formed of heavy metal, which attaches to the top of the cylinder 84, in front of the rib 86, by means of attaching bolts 94. It will be noted that the central axis or axis of elongation of the bar 92 intersects the vertical axis about which the cylinder 84 and the diffraction grating 72 rotate. The sine bar 92 tapers to a reduced width portion along its outer end and a mounting block 96 is attached to the inside of this reduced width portion by means of bolts 98 which extend thereinto. A lower plate 100 attached to the full width portion of the sine bar by means of bolts 102 and an upper plate 104 attached to the reduced width portion of the sine bar by bolts 106 extend respectively beneath and above the mounting block 96 thereby serving to more or less sandwich the same in position. The outer end of the mounting block 96 projects beyond the outer end of the sine bar and serves to mount a vertically depending pin or post 108 whose vertical center axis is aligned along the central axis of the sine bar and is hence parallel to the vertical axis of rotation of the diffraction grating. A pair of screws 110 and 112 are threaded through the outermost end of the mounting block 96 and extend back toward the reduced width end of the sine bar 92. The screw 110 contacts the front face of the sine bar while the screw 112 threads thereinto. As such, it will be apparent that the screws 110 and 112 serve as a means for very accurately positioning the pin or post 108. The pin or post 108 projects vertically downwardly beneath the level of the sine bar 102 to cooperatively engage with a lead screw assembly generally designated 114 and whose construction will now be described in detail.

The lead screw assembly 114 includes a generally U-shaped support including a flat bottom member 116 which is bolted onto the base 22 of the instrument and a pair of integral vertical upstanding parallel side members 118 and 120. A precision lead screw 122 extends between the side members 118 and 120 and is journaled therein in suitable bearings so that the lead screw can be rotated. One end 124 of the lead screw projects through the side member 120 and therebeyond and serves to mount a gear member 126 which functions to drive or rotate lead screw 122. A guide shaft 128 having a smooth and unthreaded outer surface, likewise extends between the side members 118 and 120 in parallel relationship to the lead screw 122. A traveling block means 130 forms the laterally movable part of the lead screw assembly 114. This block means 130 has a pair of spaced parallel laterally extending bores therethrough, one of which is threaded to engage with the threads on the lead screw 122 and the other of which is unthreaded to slide along the guide bar 128. It can thus be understood that as the gear 126 rotates the lead screw 122, the traveling block 130 will move laterally between the side members 118 and 120. The depending pin or post 108 from the sine bar abuts against a side surface of the traveling block 130, and is maintained in such position by means of a tension spring 132 between the screw 112 at the end of the sine bar and an attaching link 134 carried by the traveling block. Thus, lateral movement of the traveling block 130 is imparted to the depending pin or post 108 thereby causing a pivotal motion of the sine bar 92 and hence a rotation of the diffraction grating and its mounting means.

An actuating arm 136 is carried by the traveling block 130 and projects forwardly therefrom in the manner shown in FIG. 2 and this actuating arm 136 is engageable with a pair of laterally spaced limit switch devices 138 whose position determines the maximum degree of travel of the traveling block 130. The limit switches 138 are each carried by a supporting member 140 having laterally elongated slots 142 therewithin. Bolts 144 extend through the slots to attach the members to the base 22 of the instrument and this manner of attachment permits the position of the limit switches 138 to be altered somewhat laterally since the screws 144 can move within the confines of the slots 142. When the actuating arm 136 contacts one or the other of the limit switches 138 such switch will function to reverse the driving direction of the slewing motor which drives the lead screw, as will be explained hereinafter.

Turning to the means for driving the lead screw 122, it will be noted that a shaft 146 is slidably mounted through the upstanding wall portion 120 and projects on both sides of this wall portion, with the position of this slidable shaft 146 being parallel to the lead screw 122 and the guide shaft 128. A gear 148 attached to the shaft 146 meshes with the gear 126 which serves to drive the lead screw. At one of its ends, the shaft 146 carries a toothed clutch disk 150, engageable with a similar toothed clutch disk 152 carried by the drive shaft 154 of a stepping motor 156. A compression spring 158 surrounds a portion of the shaft 146 and reacts between a fixed bushing 160 and the rear of the clutch disk 150 thereby normally biasing the clutch disks 150 and 152 into mating engagement. When the clutch disks 150 and 152 are so engaged, a stepping type drive motor 156 rotates the shaft 146 and the gear 148 carried thereby, which, in turn, rotates the lead screw gear 126 and hence the lead screw 122. As aforementioned, this lead screw rotation causes the traveling block 130 to move transversely, thereby pivoting the sine bar member 92.

At its opposite end, the slidable shaft 146 carries a friction clutch disk 162 which is normally spaced slightly away from a corresponding friction clutch disk 164 carried by the drive shaft 166 of a slewing motor 168. As aforementioned, the biasing spring 158 normally keeps the toothed clutch disk 150 in engagement with the corresponding clutch disk 152 of the stepping motor, and as long as this apparatus is in this position, the friction clutch disks 162 and 164 are spaced apart from one another. It is however, possible to overcome the biasing effect of the spring 158, in a manner to be described hereinafter, for separating the toothed clutch disk 150 and 152 and for simultaneously engaging the friction clutch disk 162 with the friction clutch disk 164. When this occurs, the shaft 146 will no longer be driven by the stepping motor 156, but instead, will be driven by the slewing motor 168. The slewing motor is utilized primarily for effecting a rapid repositioning of the diffraction grating assembly 42. As such, the slewing motor operates at a considerably higher speed than does the steping motor 156. The slewing motor 168 is likewise a bidirectional type of motor whose direction of operational rotation is controlled by the previously described limit switches 138. The slewing motor 168 might be utilized, for example, when the operator wants to rapidly change from one location in the scanning cycle to another location. As another example, the slewing motor 168 might be utilized when the operator wants to entirely reverse the scanning cycle and start the same anew.

In order to switch into the slewing mode of operation, a solenoid 170 is actuated by any suitable form of actuating means. The outer end of the solenoid plunger 172 is pivotally attached to a lug 174 carried at the outer end of a pivot bar 176. The bar 176 is pivotally mounted at 178 and at its other end is attached to a disk 180 fixed to the shaft 146. If desired, a stop member 182, shown in dotted lines in FIG. 2, can be provided to limit pivotal movement of the pivot bar 176, although such movement can ordinarily be limited solely by degree of movement of the solenoid plunger 172. The lug 174 includes a screw portion 184 which threads through the free end of the pivot bar 176 and which carries a nut 186 which permits a biasing compression spring 188 to react between the nut and the pivot bar.

When it is desired to place the instrument in the slewing mode of operation, the solenoid 170 is actuated to draw its plunger 172 inwardly. This movement of the plunger causes a pivoting of a pivot bar 176 about its pivot axis 178 and thus applies an axial force onto the disk 180. This axial force overcomes the biasing force of the compression spring 158 and thus serves to disengage the toothed clutch disks 150 and 152 and simultaneously engage the friction clutch disks 162 and 164. Naturally, when the solenoid 170 is released or de-energized, the biasing force of the spring 158 returns the shaft 146 to its initial position.

A further gear 190 is carried by the slidable shaft 146, between the driving gear 148 and the disk 180 from the pivot bar. The gear 190 is connected by a driving chain 192 with a further gear 194 carried on one end of a shaft 196 which extends through a U-shaped bracket 198 disposed adjacent the diffraction grating assembly 42. At its opposite end, the shaft 196 carries a similar gear 200 connected by a further drive chain 202, shown in FIG. 3, to a mechanical counter device 204 attached to the face panel 28 of the instrument. The U-shaped bracket 198 is pivotally attached at its open end by means of a pivot pin 206, but is biased against pivoting by means of a tension spring 208. As a result, the U-shaped bracket 198 and the shaft and gears carried thereby are capable of being moved through a limited degree of movement as the mechanical counter 204 is operated. The readout from the mechanical counter 204 is designated 210, as shown in FIG. 1, and this readout is a wavelength readout, calibrated in terms of angstrom units. It is, of course, understood at this point that the particular angle at which the diffraction grating 72 was disposed is determinative of the wavelength which is directed to the exit slit mechanism 36. The sine bar-lead screw arrangement of the instrument is such that the numerical value of this wavelength is proportional to the position of the traveling block 130 along the lead screw 122 and this, in turn, is proportional to the rotation of the shaft 146 and gear 190 carried thereby. As a result, this proportional relationship can be utilized so that the counter 204 is calibrated directly in terms of the light wavelength transmitted to the exit slit mechanism 36.

Before directing attention specifically to the entrance and exit slit mechanisms 32 and 36 respectively, attention can first be directed to FIGS. 4–6 for an understanding of the manner in which the parallelogram principle of the present invention can be utilized for slit edge width adjustment. In each instance, the slit is defined by a pair of angularly converging faces 212 which terminate in edges 214 closely spaced to one another to form a slit. It is absolutely essential that the edges 214 be maintained in parallelism at all times regardless of how the edges 214 are disposed in coplanar relationship to one another so that the parallelism therebetween will always be in a single plane.

It will be understood from FIGS. 4–6 that each slit is thus defined by a pair of similar members, each of which is generally designated 216 and can be considered as a slit edge unit. In accordance with the principles of the present invention, each slit edge unit is composed of four rigid parts, namely, a fixed member generally designated 218, a movable member generally designated 220 which carries the slit edge, and a pair of parallel rigid link members generally designated 222 which function to interconnect the fixed and movable members 218 and 220. Moreover, at the interconnection of each link 222 with either the member 218 or 220, a small non-rigid flexural joint or hinge 224 is formed.

Considering the embodiments of the invention shown in FIGS. 4, 5 and 10, the FIG. 4 embodiment utilizes a pair of elongated flat metal strips or bands 226, fabricated of a suitable resilient material such as spring steel. Both the fixed and movable members 218 and 220 are formed of three separate parts, including a center part 228 and a pair of outer parts 230. The flat bands 226 extend along either side of the center section 228 and thus each flat band is sandwiched between the center section and an outer section 230. Bolts, rivets, or other attaching means 234 are utilized to attach the outer sections 230 to the center section 228, thereby firmly interlocking the bands 226 in position. It will be noted that the confronting inner sections 230 on the movable members 220 each carry the slit edge faces 212 and the slit edges 214. The links 222 are each formed by a pair of flat plates 236, one of which is positioned on either side of each band 226 to sandwich the band therebetween, with the plates 236 being attached by rivets or bolts 238. It will be noted that the length of the plates 236 is somewhat shorter than the distance between the bottom of the movable member 220 and the top of the fixed member 218, as shown in FIG. 4, and, as a result, four small portions are provided where the resilient band 226 is unrestrained by any rigid members. These four portions serve to define the four flexural or hinge joints 224 formed on each slit edge unit.

As a result of the construction just described, each slit edge unit 216 forms, in effect, a parallelogram in which two spaced parallel links 222 interconnect two spaced parallel members 218 and 220. As in the case of a true parallelogram linkage, all four parts will retain their parallel disposition even when such parts are moved. In practice, the fixed or support members 218 are always maintained in position by means of attaching screws or bolts 240, but the movable members 220 which carry the slit members are free to be moved relative to one another. If it is assumed that the slit shown in FIG. 4 is to be widened, each of the movable members 220 would be moved laterally outward. Since the support members 218 are fixed in position, the result of this movement would be that each movable member 220 would be moved slightly closer to its parallel support member 218, and this would be accomplished by displacing the links 222 to an angular disposition. This movement is permitted because of the four flexural or hinge joints 224, but since these are the only flexible parts of the unit, the two links 222 will still be maintained in parallel disposition, the movable members 220 will still be maintained in parallel disposition to their fixed members 218, and the slit edges 214 will hence still remain in parallelism although the spacing therebetween will be increased somewhat.

Referring now to another embodiment of slit edge unit 216, attention is directed to FIG. 5 wherein the entire unit 216 is formed of a single integral flat sheet of resilient material, such as spring steel or plastic. Each sheet is cut away centrally to define therewithin, a generally rectangular opening having cut-away corners. More particularly, the central opening, which can be generally designated 242, provides a pair of opposed parallel side edges 244 which form the inner edges of the links 222 and a pair of parallel upper and lower edges 246 and 248, the former of which forms the bottom of the movable member 220 and the latter which forms the top of the fixed member 218. The edges 244, 246 and 248 do not intersect with one another at the corners, but instead, at each corner, a cut-away portion 250 is provided. This may perhaps be better understood by reference to FIG. 7 showing a fragmentary enlargement of a round cut-away portion 242. In FIG. 7, the imaginary point where the edges 244 and 246 would intersect is designated P and this point forms the center of a circle in which the surface 250 lies. In other words, the surface 250 is a radial arc generated about the point P and hence the circular cut-out portion 250 circumscribes 270° of a circle. Thus, the flexural hinges or joints 224 are formed in the sheet material of the unit 216 in alignment with the edges 246 and 248. The FIG. 7 arrangement is, of course, only one suitable form of achieving the flexural hinges through utilization of a cut-away portion 250, and other suitable forms will be apparent to those skilled in the art. One other suitable form is shown in FIG. 13 wherein the point P is not located at the intersection of the edges 244 and 246 and thus the portion 250 only circumscribes 180° of a circle. Also, the cut-away portion 250 need not even be a constant radius arc generated about the point P, as is apparent from FIG. 13 wherein an elongated cut-away portion is formed by two 90° arcs generated about spaced points P' and P''. The length of the flexural hinge 224 is thus the distance between the points P' and P'' and it can be adjusted by selected variation of this distance. Many other suitable forms of cut-away portions 250 can also be envisioned, but for purposes of this detailed description it is not considered necessary to set forth each of these forms herein. Instead, it is adequate to state that the forms of cut-away portions shown in FIGS. 7, 12 and 13 are exemplary.

The left-hand unit 216 of FIG. 5 is shown in a dotted line position which represents the path of movement which would be followed by the parallelogram linkage if the slit between the edges 214 were to be widened. As will be noted from this dotted line configuration, the movable member 220 which forms the upper portion of the unit 216 has moved slightly closer to the fixed member 218 which forms the bottom of the unit 216, but the edges 246 and 248 nevertheless remain in parallelism. The links 222 have been pivoted or moved outwardly at a slight angle from their original position, but the two links themselves also remain in parallelism. It will, of course, be understood that when the left-hand unit 216 is moved to this dotted line position, the right-hand unit is similarly moved and, as a result, the width of the slit between the edges 214 is widened, but the edges 214 nevertheless remain in exact parallelism. While the sloped surfaces 212 which terminate at the slit edges 214 have been shown projected slightly inwardly from the inner edges of the units 216 in the embodiment of FIG. 4 and that of FIG. 5, this construction is by no means necessary and, if desired, the slit edges 214 could be made substantially coincident with the inner edges of the units 216, and a separate set of bearing surfaces could be provided for the actuating pins to bear upon.

Referring now to still another embodiment of slit edge unit 216, attention is directed to FIGS. 10 and 11 wherein, like FIG. 4, flat resilient bands 226 of spring steel or other suitable material are used for the links 222. However, instead of attaching the bands by bolts or the like, as in FIG. 4, the bands 226 in the FIG. 10 embodiment are attached by brazing their ends into suitable slots in the fixed and movable members 218 and 220. This brazing is represented by the letter B in FIG. 10. Also, instead of using bolted plates 236 to rigidify the center of the links, as was done in FIG. 4, the FIG. 10 embodiment uses either a flat plate 251 brazed onto band 226, or, alternatively, bend a flange 253 inwardly from the band 226. As shown in FIG. 11, this flange 253 can either be formed at one edge of the band 226 or can be stamped out of the band 226. In either instance, or in the instance of utilizing the plate 251 brazed onto the band 226, the result is that four spring steel flexural joints 224 are provided. While FIG. 11 illustrates the different forms of rigidifying means provided on a single slit edge unit 216, it will be understood that such a showing is more for illustrative purposes than for depicting the manner of actual construction of a single slit edge unit.

Referring now to FIGS. 8 and 9 which show the details of the entrance slit mechanism 32 and to FIG. 2 which shows the details of the exit slit mechanism 36, the operation of the slit adjusting mechanism of the present invention can now be described. It will be understood that the entrance and exit slit mechanisms are identical in construction although the movable parts thereof can be reversed, as explained hereinafter, so that the mechanisms can be driven in unison. A flat backing plate 252 is formed with an aperture or bore 254 adjacent the upper end thereof. This backing plate 252 is situated in a suitable recess in the side members 24 and 26, in the manner shown in FIG. 2, with the aperture 254 being axially aligned with its associated port, either the entrance port 30 or the exit port 34. A pair of slit edge units of the type shown in FIG. 5 are attached to this backing plate 252 by screws 240 and the slit edges 214 are aligned with the aperture 254. A pair of similar side members 256 are positioned along the outer edges of the backing plate 252 and attached thereto by means of screws 258. The side members each carry an inwardly directed bowed band spring 260 which contacts the exterior edge of the adjacent unit 216 along the movable portion thereof. Thus, the combined force of the opposed bowed springs 260 serves to maintain the slit edges 214 close against one another.

An elongated lever 262 is positioned in front of the two slit edge units 216 and the lower end of this lever, which extends beneath the lower end of the backing plate 252 carries a forwardly directed pin 264. The lever 262 is mounted in position by a pivot pin 266 which has its rear end journaled in the backing plate 252 and which has its forward end journaled in sleeve or bushing 268 maintain in position by means of a snap nut or ring 270. It is important to note that the pivot axis of the lever 262, which is defined by the central axis of pivot pin 266, is aligned with the center axis of the slit. If the slit edges 214 were completely closed until the same contacted one against the other, then this contact line would be aligned along the central axis of the slit. Once the slit edges are opened somewhat to define a slit through which light can pass, each slit edge 214 will be displaced a small distance to either side of the central axis of the slit and it is this central axis which coincides with and perpendicularly intersects the pivot axis of the lever 262. A pair of pins 272 and 274 are carried by the lever 262, the former being disposed above the pivot axis and the latter being disposed therebeneath. Each of the pins 272 and 274 projects rerawardly to contact the surfaces 216 and hence each pin end is of a conical configuration having an angle corresponding to the angle of inclination or taper of the faces 212.

Looking at the slit mechanism shown in FIG. 8, it will be apparent that when the lever 262 is rotated about its pivot 266, the pin 272 will contact against the face 214 of the left-hand slit edge unit 216 and will hence move the same outwardly against the biasing force of the load spring 260. Simultaneously, the pin 274 will contact against the sloping face 212 of the right-hand slit edge unit 216 to similarly move the same outwardly. Accordingly, as lever 262 is rotated, the pins 272 and 274 cooperatively engage the opposed movable members 220 of the slit edge units 216 to change the width of the slit which it will be recalled, is defined by the distance between the parallel slit edges 214.

To accomplish this pivotal movement of the lever 272, a precise lead screw 276 is rotatably mounted between the spaced side members 256 and a non-threaded end 278 of the screw projects through and beyond one of the side members 256. A non-threaded guide bar 280 also extends between the side members 256 in spaced parallel relationship to the lead screw 276. A traveling block member 282 is provided with a threaded internal bore 284 so that the block 282 can be threaded upon the lead screw 276 for lateral movement therealong. An open ended slot 286 is provided at the top of the block 282 to receive the guide bar 280 which prevents the block 282 from rotating as it travels along the lead screw 276. Thus, as the lead screw 276 is rotated, the traveling block 282 will move laterally therealong and since an edge surface of the traveling block 282 engages with the pin 264 at the lower end of the lever 262, the lateral movement of the traveling block 282 will cause a corresponding pivotal movement of the lever 262 and hence a variation in the spacing of the slit edges 214.

In the entrance slit mechanism 32 shown in FIG. 8, the movement of the traveling block 282 is in a right-hand direction from the center axis of the entrance slit. The exit slit mechanism 36 is identical, except for the fact that the pin 264 is disposed on the opposite side of the traveling block 282 so that in the exit slit mechanism, movement of the traveling block is in a left-hand direction from the center axis of the exit slit, when the exit slit mechanism 26 is oriented in the same position as the entrance slit mechanism is shown in FIG. 8.

Referring once again to FIG. 2, it will be noted that a gear 288 is attached to the projecting shaft 278 from the entrance slit mechanism and a similar gear 290 is attached to the projecting shaft 278 from the exit slit mechanism. These two gears 288 and 290 are interconnected with one another by a driving chain 292 so that a rotation of the entrance slit lead screw 276 will cause a corresponding rotation of the exit slit lead screw 276. In other words, an increase in the slit width of the entrance slit will cause a corresponding increase in the slit width of the exit slit, and vice versa.

Figure 3:
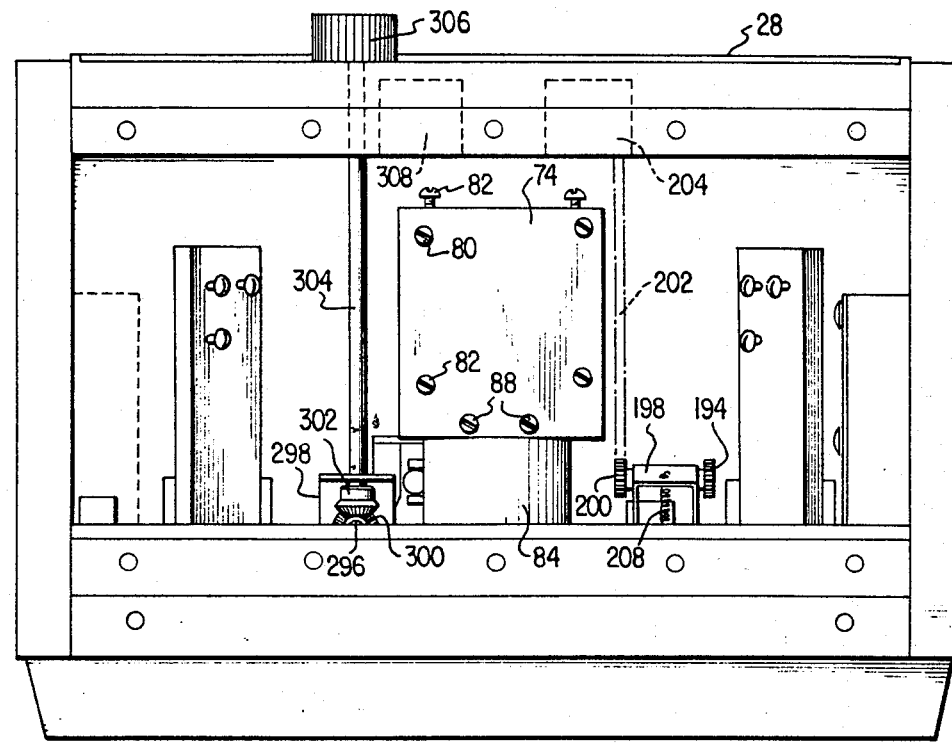
FIG. 3 is an end view of the instrument of FIG. 2.

The gear chain 292 also serves to rotationally drive a gear 294 mounted on the end of a shaft 296 fixed in position on a support 298 positioned next to the diffraction grating mechanism 42. As can best be seen from FIG. 3, the shaft 296 carries a beveled gear 200 which forms one half of a right angle drive mechanism. The other half of a right angle drive mechanism is formed by similar beveled gear 302 carried on the end of a shaft 304 which projects downwardly from the face plate panel 28 and which carries a control knob 306 at its upper end. As shown in FIG. 3, the shaft 304 is operatively coupled with a mechanical counter 308 which gives a reading of a slit width in microns on the read-out scale 310 shown in FIG. 1. It will thus be understood that when the operator rotates the knob 306, he manually drives the chain 292 and, depending upon the direction of knob rotation, either increases or decreases the width of both the entrance and exit slits. As the knob 306 is rotated, the operator gets the visual read-out of the slit width at 310 and since control of the slit width determines the resolution of the monochromator, it, in effect, determines the width of the frequency range which exits from the instrument through the exit port 34.

As previously indicated, a light-tight cover, not shown, is placed over the top of the monochromator 20 so that the optical system in the interior thereof is completely darkened except for the light beam which enters the same through the entrance port 30. The instrument of the present invention thus provides a high quality, high precision, yet compact form of apparatus which is capable of being used with visual light, as well as with ultraviolet and infrared radiation.

Finally, if attention is directed to FIG. 14, a further modification of the invention is illustrated wherein a pressure adjustment of the unit 216 against the backing plate 252 is permitted. As aforementioned, it is essential that the slit edges 214 operate in a common plane. This is accomplished, for example, in the arrangement of FIG. 9 by placing the units 216 upon a flat backing plate 252 whose surface defines the plane through which the edges 214 are movable. In certain instances, however, the links 222 may be relatively rigid and thus somewhat lacking in ability to move perpendicularly to the surface of the backing plate 252. Thus, it may prove difficult to maintain the units 216 in a condition where the links 222 are neither spaced away from the plate 252 nor pressed too tightly against the plate 252. In either of these situations, the links 222 are not free to move in a manner which provides coplanar movement of the slit edges 214. To overcome this potential difficulty, the arrangement shown in FIG. 14 uses a slit edge unit 216 having support members 218 and 220 joined by a central portion generally designated 320 which is joined at its opposite ends by bolts or rivets 322 to the respective members 218 and 220. The central portion 320 includes a flat or planar top portion of spring steel or the like which contains the links 222, the cut-away portion 224 and is generally similar to the arrangement of FIGS. 7, 12 and 13. However, the central portion 320 also includes a pair of downwardly directed side flanges 324 whose height is substantially equal to the thickness of the members 218 and 220. Each side flange is notched at 326, which is aligned with the cut-away portions 250 on the top surface, to thus form a reduced portion or hinge 328 juxtaposed to, but offset 90° from, each flexural joint 224. The provision of the hinges 328 makes the links flexible in a direction generally perpendicular to the plate 252, just as the flexural joints 224 make the links flexible in a plane parallel to the plate 252. In this manner, a control spring 330 can be used in conjunction with the movable member 218 to vary the degree of force or pressure urging the member 218, and thus the slit edge 214, against the backing plate 252.

After reading the foregoing detailed description, it should be apparent that the objects set forth at the outset of the specification have been successfully achieved by the present invention. Nevertheless, it will be apparent to those skilled in the art that various changes may be made in the precise form of apparatus shown herein, without departing from the spirit and scope of the invention as defined in the appended claims, since the foregoing detailed description is merely directed to a preferred embodiment of the invention.

What is claimed is:

1. A unit adapted for use in a variable width slit mechanism, said unit comprising: a generally rectangular framework formed of spaced parallel first and second portions and spaced parallel third and fourth portions extending between said first and second portions; said first, second, third and fourth portions thus defining an opening therebetween; said first portion having a linear side edge which serves to define one slit edge; said second portion being adapted to be fixed in position and said first portion being laterally restrained solely by said third and fourth portions so that said first portion is movable relative to said second portion when said second portion is fixed in position; said third and fourth portions each including an elongated central section having a specified width and a pair of end sections having a width which is a minor fractional amount of said specified width, said end sections serving to connect said third and fourth portions between said first and second portions; said first and second portions and said center sections of said third and fourth portions being relatively rigid; said end sections of said third and fourth portions being relatively flexible and thus serving to form flexural joints in said framework, said framework thus forming a parallelogram arrangement wherein, when said second portion is fixed in position, said first portion carrying said slit edge can be laterally displaced and hence moved toward and away from said second portion while remaining in parallelism therewith; said movement of said first portion relative to said second portion being accomplished by movement about said flexural joints, and wherein said third and fourth portions each are formed by a pair of perpendicularly disposed members which define a generally L-shaped configuration, and wherein each of said members is provided with said flexural joints, thus allowing flexibility in a lateral direction and in a direction perpendicular to said lateral direction.

2. A unit as defined in claim 1 further including a planar backing plate against which said unit abuts, the plane of said backing plate defining the plane in which said lateral movement occurs.

3. A unit as defined in claim 2 further including biasing means cooperatively acting upon said first portion to control the pressure of said first portion against said backing plate.

References Cited
UNITED STATES PATENTS

| | | | |
|---|---|---|---|
| 2,750,836 | 6/1956 | Fastie | 356—100 |
| 2,795,170 | 6/1957 | Hansen et al. | 356—100 |
| 2,861,172 | 11/1958 | Mandler | 356—100 |
| 2,987,958 | 6/1961 | Marshall, Jr. | 356—100 |
| 2,998,730 | 9/1961 | Raskhodoff et al. | 350—271 |
| 3,433,557 | 3/1969 | McPherson | 356—100 |
| 3,455,636 | 7/1969 | Haswell | 356—89 |
| 3,457,004 | 7/1969 | Seiferth | 350—271 |
| 3,472,597 | 10/1969 | Whitten, Jr. | 356—106 |

OTHER REFERENCES

"On an Optical Slit"; Strong; Review of Scientific Instruments; vol. 12, 1941, p. 213.

Marine Engineering, vol. I; Seward, H. L., editor; published by The Society of Naval Architects & Marine Engineers, New York, N.Y., 1962, p. 220.

RONALD L. WIBERT, Primary Examiner

V. P. McGRAW, Assistant Examiner

U.S. Cl. X.R.

356—100